A. KUBIK.
DUMPING DOOR ACTUATOR.
APPLICATION FILED SEPT. 28, 1920.
1,389,449.
Patented Aug. 30, 1921.
5 SHEETS—SHEET 1.
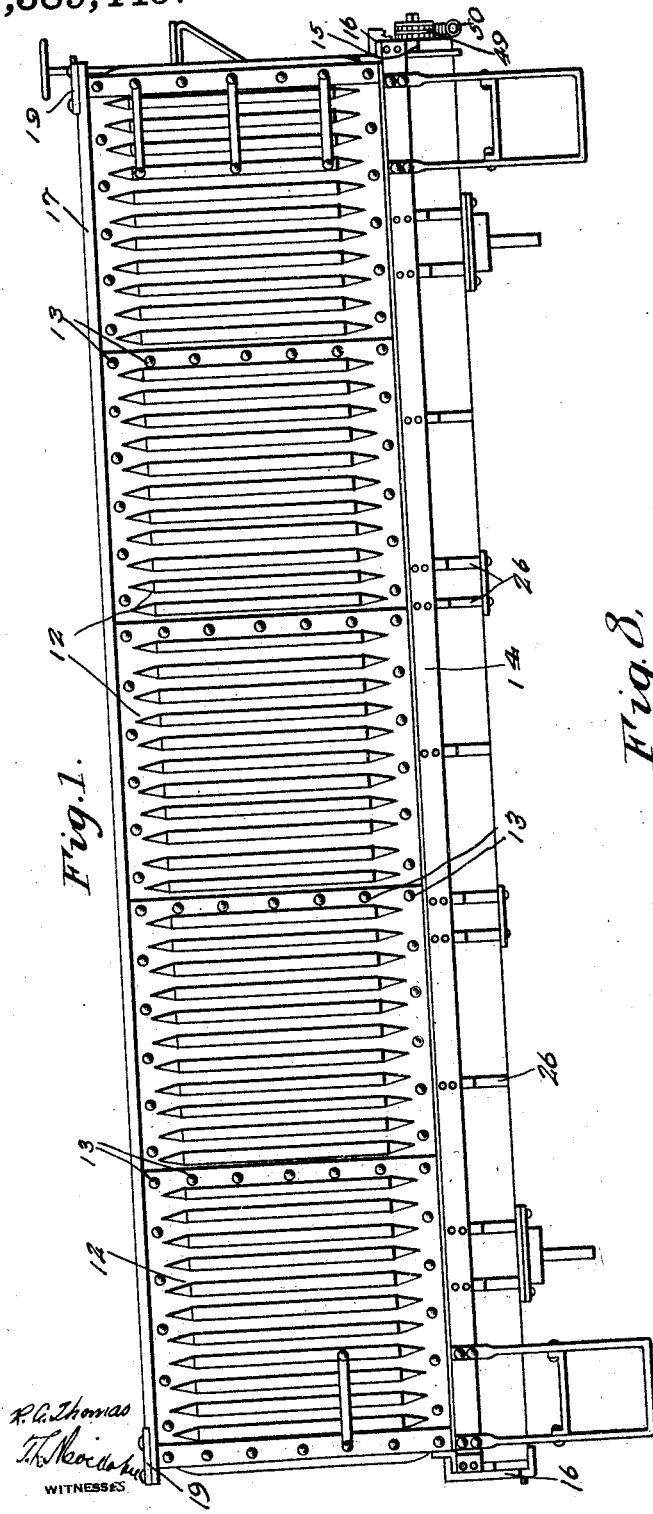
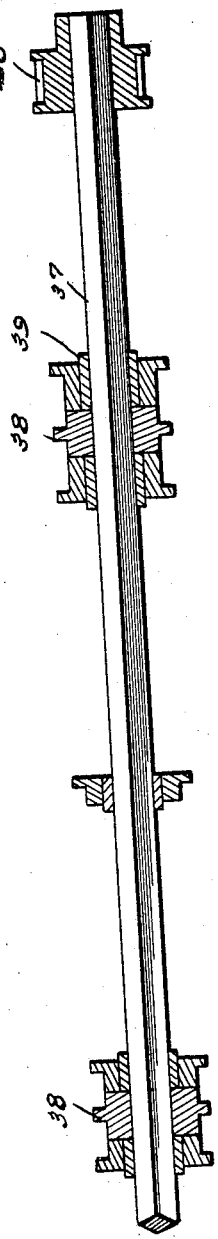
Andrew Kubik INVENTOR A. KUBIK.
DUMPING DOOR ACTUATOR.
APPLICATION FILED SEPT. 28, 1920.
1,389,449.
Patented Aug. 30, 1921.
5 SHEETS—SHEET 2.
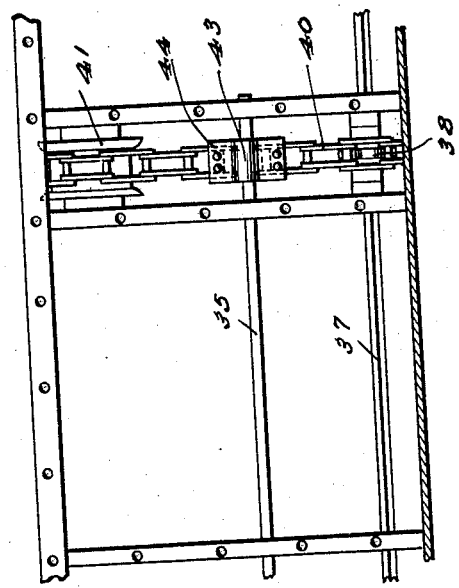
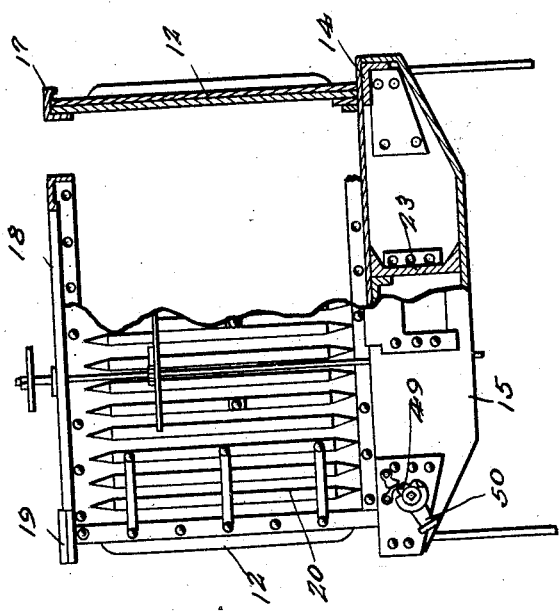
Andrew Kubik INVENTOR
BY *Victor J. Evans*
ATTORNEY

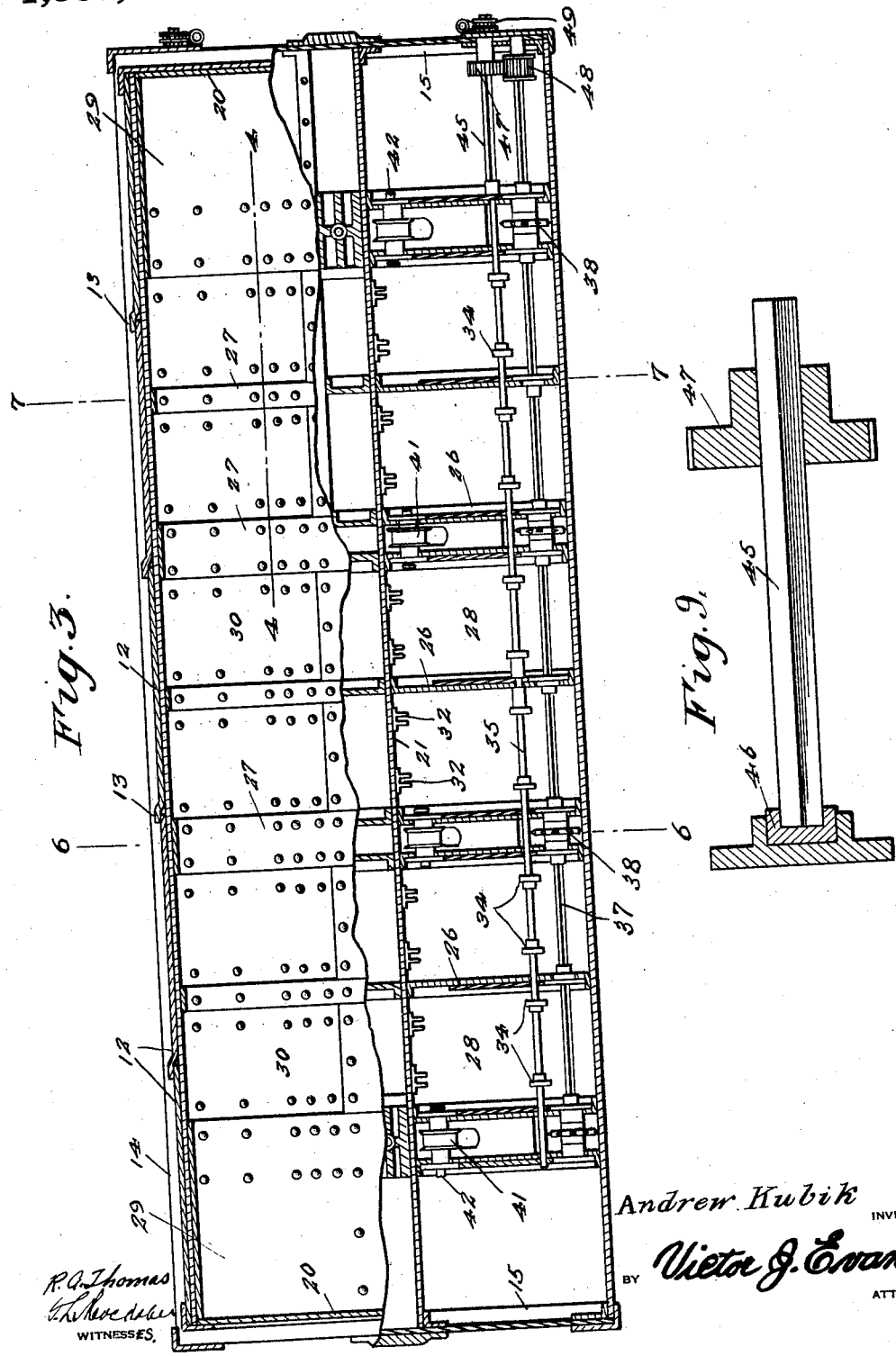

A. KUBIK.
DUMPING DOOR ACTUATOR.
APPLICATION FILED SEPT. 28, 1920.

1,389,449.

Patented Aug. 30, 1921.
5 SHEETS—SHEET 4.

Andrew Kubik, INVENTOR

BY *Victor J. Evans*
ATTORNEY

WITNESSES
R. O. Thomas

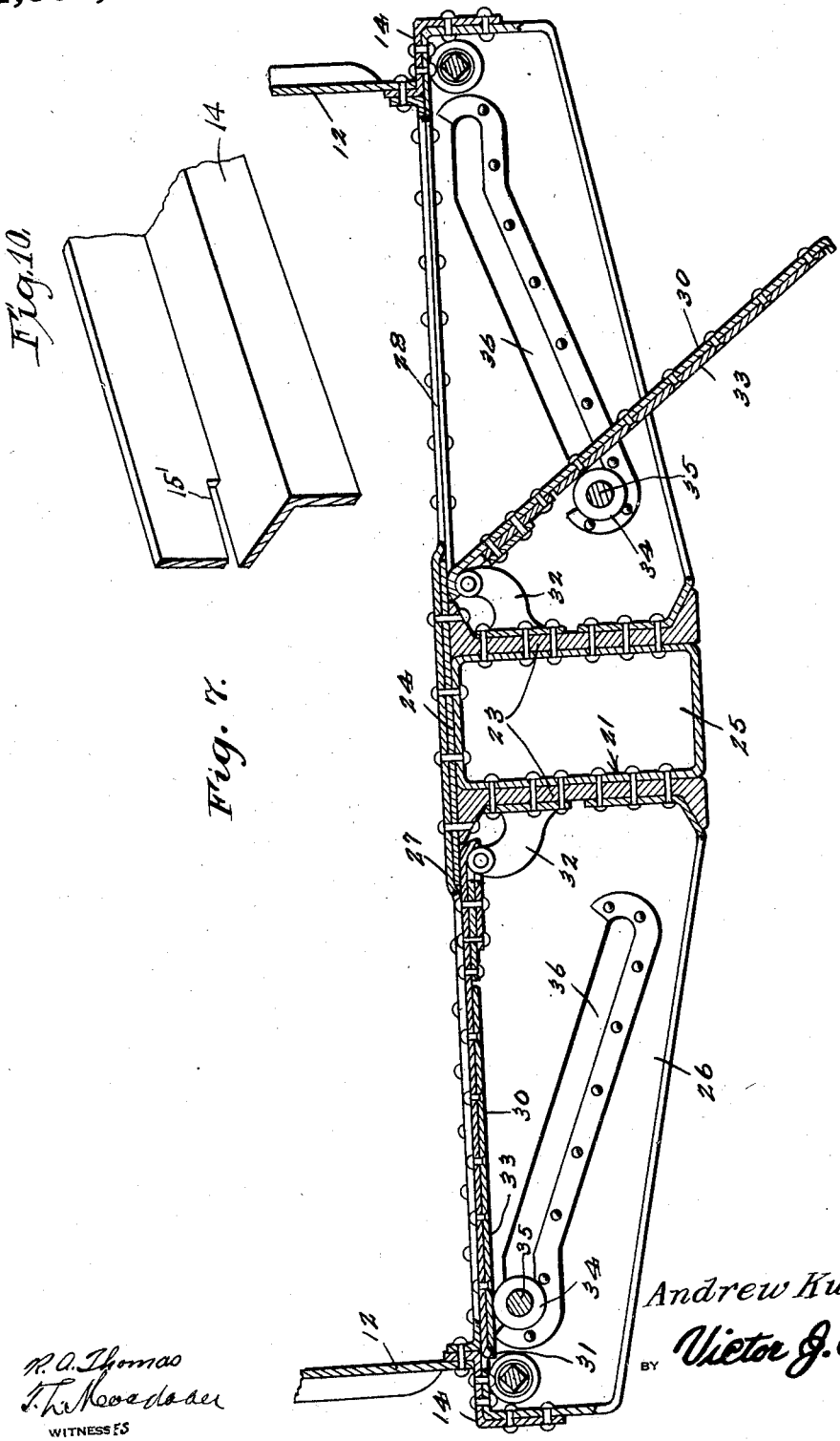

UNITED STATES PATENT OFFICE.

ANDREW KUBIK, OF MICHIGAN CITY, INDIANA.

DUMPING-DOOR ACTUATOR.

1,389,449.  Specification of Letters Patent.  Patented Aug. 30, 1921.

Application filed September 28, 1920. Serial No. 413,360.

*To all whom it may concern:*

Be it known that I, ANDREW KUBIK, a citizen of the United States, residing at Michigan City, in the county of La Porte and State of Indiana, have invented new and useful Improvements in Dumping-Door Actuators, of which the following is a specification.

This invention relates to railway cars of the gondola type, the object being to provide a car which is strong and durable in construction and which may be easily repaired when necessary.

Another object is the provision of novel means for dumping the car, the mechanism employed being protected from contact with the contents of the car when the latter is being dumped.

Another object is the provision of a dumping mechanism of simple construction and easy operation, in which the doors are of sectional formation, permitting of the substitution of a new door section without discarding another door.

Other objects and advantages of the invention will appear as the following description is read in connection with the accompanying drawings.

In the drawings:—

Figure 1 is a side elevation of a car constructed in accordance with the present invention, the tracks of the car being removed.

Fig. 2 is an end view of the same.

Fig. 3 is a horizontal section with parts broken away to more clearly illustrate the floor structure of the car.

Fig. 4 is an enlarged sectional view on the line 4—4 of Fig. 3.

Fig. 5 is an enlarged sectional plan of a portion of the floor structure and illustrating the arrangement of the door operating chains.

Fig. 6 is an enlarged sectional view on the line 6—6 of Fig. 3.

Fig. 7 is a similar view on the line 7—7 of Fig. 3.

Fig. 8 is a detailed view showing the mounting of the sprockets.

Fig. 9 is a like view illustrating the bearing for one end of the ratchet shaft.

Fig. 10 is a fragmentary view illustrating the structure of the Z bar which forms a portion of the car frame.

Referring in detail to the drawings, wherein like characters of reference denote corresponding parts, the car is made up of a plurality of metal plates, girders and connecting bars and includes corrugated side plates 12 which overlap one another and are riveted together as shown at 13. These plates are riveted to the bottom frame of the car, the said frame including side sills 14. These side sills are connected by end sills 15, the former being slotted as shown at 15' to receive the latter. The underframe is also provided at each end with bumper plates 16. The side plates 12 are also riveted to a frame which includes side bars 17 and end bars 18, these bars being connected by corner plates 19. The ends of the car are also formed of overlapping corrugated plates 20, which are similar to the plates 12. This structure provides an exceedingly rigid and durable car body which is supported upon an underframe of novel construction. This underframe in addition to the side sills 14 and the end sills 15, further includes a center sill 21 which is disposed longitudinally of the car and comprises spaced longitudinal channel bars 23 which are connected along their upper edges by a cover plate 24. Connected to this plate and to the channel bars 23 are flanged plates 25. In addition, the floor frame is strengthened by spaced transversely arranged cross girders 26, the flanges of which are riveted to the channel bars 23 and to the side sills 14. The side sills and center sill are connected by spaced transversely arranged bars 27, the latter being riveted to the center sill and the flanges of the cross girders 26, with their extremities riveted to the vertical flanges of the Z bar side sills 14. This provides a floor having a number of spaced openings 28 arranged upon each side of the center sill through which the contents of the car may be dumped. It is preferred not to extend these openings to the extreme ends of the car and the plate 29 is therefore riveted to the frame at this point.

The openings 28 are normally closed by doors 30, the latter being of sufficient width to project beyond the edges of the cross bars 27. The doors are provided with marginal flanges 31 and have their inner ends hingedly secured between spaced ears 32 which are secured to the channel bars 23 of the center sill. In addition, the doors have secured to their end faces angle bars 33 which provide brackets for wheels or rollers 34, the latter being mounted upon a transversely movable shaft 35. One of these shafts extends longitudinally upon each side of the car and is operated within an upwardly and outwardly inclined guide slot 36, the outer end of which is parallel to the car floor. By reference to Fig. 7 of the drawings, it will be seen that when the shaft 35 is in the position shown at the right of this figure, the door will be in the lowered position and in order to close the door the shaft must be moved upward and outward until it reaches the position shown to the left of this figure, the movement of the shaft closing the door and its final position holding the door in closed position.

In order to accomplish this movement of the shaft 35, there is provided a squared shaft 37 which extends longitudinally beneath each side of the car, being mounted in bearings provided in the cross girders 26, in which the slots 36 are also formed. The shaft 37 is preferably square in cross section and is provided with a number of sprocket wheels 38. In order that the shaft 37 may be rotated in its bearings, it is provided with bushings 39 having a cylindrical periphery and a square bore for the reception of the shaft 37, as illustrated in Fig. 9 of the drawings. Operating over the sprockets 38 are chains 40, these chains also passing over grooved idlers 41 which are mounted upon shafts 42 also upon each side of the center sill. The ends of the chains 40 are connected to the shafts 35 and for this purpose these shafts are provided with planking plates 43 having oppositely extending ears 44. When the plates are secured upon the shafts 35, the ears 44 are arranged upon opposite sides of the shaft and serve as a means for securing the plates together. In addition, these ears serve as a connection to the ends of the chains 40. Thus, rotation of the shafts 37, will through the chains 40, impart a sliding movement to the shafts 35, the direction of movement depending upon the direction of rotation of the shafts.

To operate the shafts 37, there is located upon opposite sides of the car and at one end thereof, squared shafts 45, the latter being mounted in suitable bearings. The inner bearings of one of these shafts is shown in Fig. 10 of the drawings and includes a cylindrical bushing 46 which is provided with a squared socket to receive the end of the shaft. This shaft 45 carries a pinion 47, which engages a pinion 48 carried by the shaft 37 so that when either of the shafts 45 are rotated, its respective shaft 37 will be given a like movement and thereby impart a sliding movement to the particular shaft 35, to which it is connected. The ends of the shafts 45 extend through the end of the car and are each provided with a double ratchet mechanism 49, the latter including a socketed extension 50 for the reception of an operating handle and by means of which motion may be imparted to the shaft 45.

The invention is susceptible of various changes in its form, proportions and minor details of construction and the right is hereby reserved to make such changes as properly fall within the scope of the appended claim.

Having described the invention what is claimed is:—

A car comprising a bottom having a plurality of spaced openings upon each side of its longitudinal center, hinged doors for closing the openings, a transversely movable shaft located below the doors at each side of the longitudinal center line and engageable with the doors, semi-circular clamping plates secured upon the shafts, combined clamping and connecting ears extending from said plates upon opposite sides of the shafts, chains movable transversely beneath the car and having their opposite ends connected to said ears and means for operating the chains to move the shafts and actuate the doors.

In testimony whereof I affix my signature.

ANDREW KUBIK.